United States Patent [19]

Ngai

[11] Patent Number: 5,619,383
[45] Date of Patent: Apr. 8, 1997

[54] METHOD AND APPARATUS FOR READING AND WRITING AUDIO AND DIGITAL DATA ON A MAGNETIC TAPE

[75] Inventor: Hing Y. Ngai, Rancho Palos Verdes, Calif.

[73] Assignee: Gemstar Development Corporation, Pasadena, Calif.

[21] Appl. No.: 441,392

[22] Filed: May 5, 1995

Related U.S. Application Data

[63] Continuation of Ser. No. 67,870, May 26, 1993, abandoned.

[51] Int. Cl.⁶ ........................................ G11B 5/02
[52] U.S. Cl. ................................. 360/20; 360/29
[58] Field of Search .......................... 360/20, 29, 30, 360/19.1, 18; 84/642, 645; 395/2, 2.39

[56] References Cited

U.S. PATENT DOCUMENTS

| | | | |
|---|---|---|---|
| 3,732,364 | 5/1973 | Terada | 178/6.6 A |
| 3,913,135 | 10/1975 | Damlamian | 360/79 |
| 4,383,280 | 5/1983 | Copeland | 360/18 |
| 4,460,929 | 7/1984 | Bader | 360/30 |
| 4,547,817 | 10/1985 | Klaassen | 360/29 |
| 4,571,641 | 2/1986 | Fujiki et al. | 360/19.1 |
| 4,630,134 | 12/1986 | Kanamaru | 358/343 |
| 4,796,106 | 1/1989 | Veillard | 360/30 |
| 4,797,750 | 1/1989 | Karweit | 358/335 |
| 4,849,831 | 7/1989 | Hino | 360/19.1 X |
| 4,849,837 | 7/1989 | Zwicky | 360/68 |
| 5,046,004 | 9/1991 | Tsumura et al. | 364/419 |
| 5,062,008 | 10/1991 | Ichinoi et al. | 360/29 |
| 5,212,551 | 5/1993 | Conanan | 348/484 |
| 5,231,542 | 7/1993 | Heindel | 360/18 X |

OTHER PUBLICATIONS

"A Professional DAT System", Ueno et al., SMPTE Journal, Jul. 1990, pp. 542–552.

*Primary Examiner*—Andrew L. Sniezek
*Attorney, Agent, or Firm*—Christie, Parker & Hale, LLP

[57] ABSTRACT

A method and apparatus for recording and reading magnetic tape that contains audio signals and data that is related to the audio signals. In the preferred embodiment, the audio signals are music, and the related data are lyrics to the music displayed in real time to the music as it is being played. The lyrics are modulated onto an ultrasonic carrier signal and mixed with the audio signal on one track of the tape. The tape may be played on a conventional tape recorder without having interference from the recorded data at ultrasonic frequencies. In a suitably equipped tape player, the mixed signal is read and filtered to generate a high pass filtered signal and a bandpass filtered signal. The bandpass filtered signal filters out frequencies outside the range of human hearing to generate an audio signal. The high pass filtered signal is demodulated by the carrier frequency to reconstruct the lyrics. A two-track system records an unmodulated carrier frequency on the second track and is subtracted from the modulated carrier frequency to generate the lyrics. This compensates for variations in tape speed that shift the frequency of the data modulated carrier signal.

14 Claims, 3 Drawing Sheets

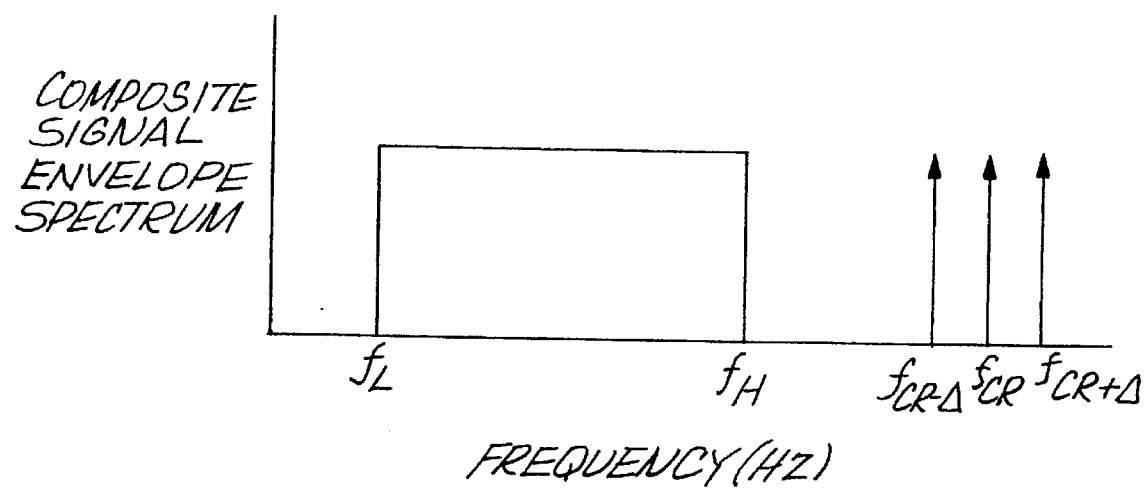

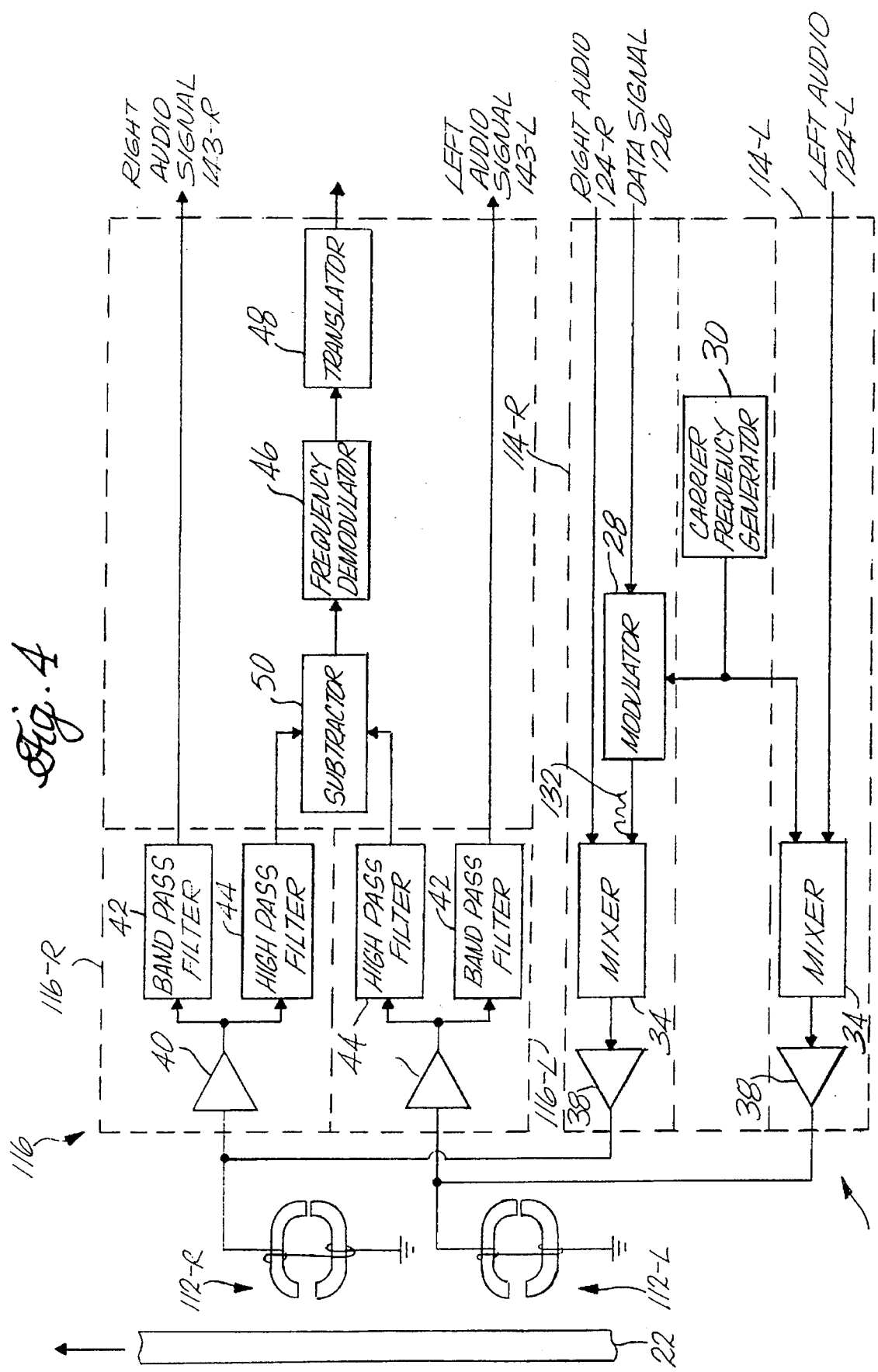

METHOD AND APPARATUS FOR READING AND WRITING AUDIO AND DIGITAL DATA ON A MAGNETIC TAPE

CROSS-REFERENCE TO RELATED APPLICATION

This is a continuation of patent application Ser. No. 08/067,870 entitled "A METHOD FOR READING AND WRITING AUDIO AND DIGITAL DATA ON A MAGNETIC TAPE" and filed May. 26, 1993, now abandoned, which is incorporated herein by reference as though set forth in full.

FIELD OF THE INVENTION

This invention relates to the recording and reading of magnetic tape, especially useful for karaoke, and more particularly, to the reading and recording of an audio signal and digital data related to the audio signal on a single track of a magnetic tape.

BACKGROUND OF THE INVENTION

Karaoke has achieved enormous popularity worldwide across all age groups. Karaoke is a video sing-along. Lyrics of a song being played are displayed in real time and in synchronization with the music of the song as it is being played. Karaoke has become very popular in bars, television shows, and at family gatherings.

As more people participate in karaoke, demand for consumer electronics that provide karaoke increases. Many existing video systems presently provide karaoke lyrics by use of media other than audio magnetic tape. For example, the lyrics to the song being played are recorded on a video tape. The lyrics are recorded on the video portion of the video tape in a manner similar to the recording of television images. Further, the lyrics may be superimposed over a television image of the performers of the music, such as a music video, or over other artistic video creations. Similarly, video disks may contain karaoke lyrics. As with video tape, the lyrics may be recorded along with other video information. Video disks usually store the lyrics and other video information digitally.

Audio tape recorders, such as cassette tape recorders, and audio tapes are not presently equipped to handle karaoke. In particular, a magnetic audio tape is divided into two longitudinal regions on the tape. One region of the tape is for recording and playing music when the tape is moving in one direction and the other region is for recording or playing music when the tape is moving in the opposite direction. Each region is divided into two spaced apart longitudinal tracks for recording music for the right and left channels of a stereo recording. Many tape players record either digital data which could be music or analog data, particularly music. Space for recording a separate track for karaoke lyrics is extremely limited on the tape. Furthermore, recording a third track may prevent karaoke tapes from being played on existing cassette recorders when it is desired not to display the karaoke lyrics.

There is a need for a cassette tape that can be interchangeably played both in a standard cassette recorder and a karaoke cassette player.

There is also a need for a cassette tape containing the karaoke lyrics that can be economically produced.

The invention resolves these problems by providing a cassette tape that can be interchangeably played in standard cassette players and karaoke cassette players and has the lyrics recorded on the audio tracks of a standard cassette tape in the present tape format but not retrievable by the standard cassette players.

SUMMARY OF THE INVENTION

In a first embodiment, a method and apparatus record and read audio information in one form and data related to the audio information in a different form on a single track of a magnetic tape. The magnetic tape may also be played without interference from the non-audio information in a standard magnetic tape player that plays only audio signals. A signal containing the audio information is generated. Data is generated that is related to the audio information. An ultrasonic carrier signal is generated and modulated with the data related to the information in the audio signal. The audio signal and the modulated ultrasonic signal are combined to form a composite signal. The composite signal is applied to a recording head positioned above the track of the magnetic tape to create a changing magnetic field in response to the composite signal. The track of the magnetic tape is magnetized in response to the changing magnetic field to thereby record the composite signal thereon.

The signals are read from the signal track by detecting changes in the magnetization of the track on the magnetic tape. An electrical signal is generated in response to the detected changes and divided into first and second divided signals. The first divided signal is filtered to remove frequencies outside of the frequency range of human hearing to form an audio signal. The second divided signal is filtered to remove frequency components below a predetermined cut-off frequency to form a high pass filtered signal. The high pass filtered signal is demodulated to form a data signal containing the information related to the audio signal. In a preferred embodiment, the audio signal contains music and the data signal contains lyrics related to the music. Alternately, the audio signal contains spoken words, and the data signal contains a transcript or translation of the spoken words.

In a second embodiment, a method for recording and reading audio information in one form and data that is related to the audio information in a different form on a two-track magnetic tape is provided. The method corrects shifts in frequency caused by variations in tape speed and properly demodulates the data for reading. Changes in the magnetization in the first and second tracks on the magnetic tape are detected. First and second composite signals are generated from the detected changes in magnetization of the first and second track, respectively. Each composite signal corresponds to the information recorded in the associated track on the tape and has audio information and ultrasonic information related to the audio signal. Each composite signal is split into a first and second divided signal. The first divided signal of each track is then bandpass filtered to eliminate infrasonic and ultrasonic frequencies. A respective audio signal is generated from each of the bandpass filtered signals. The second divided signal of each track is high pass filtered to eliminate low frequencies. The high pass filtered signal from the first track is subtracted from the high pass filtered Signal from the second track. The subtracted signal is then demodulated. An information signal is generated from the demodulated signal.

During recording, a first and second audio signal containing audio information are generated. Data that is related to a portion of the first and second audio signal is generated. Furthermore, an ultrasonic carrier signal is generated. The ultrasonic carrier signal is modulated by the data that is related to a portion of the first and second audio signals. The modulated ultrasonic carrier signal is mixed with the first audio signal to form a first composite signal. The ultrasonic carrier signal is mixed with the second audio signal to form a second composite signal. The first and second composite signals are applied to a respective recording head positioned above a respective track to generate a varying magnetic field in response to the composite signal. Each track of the magnetic tape is magnetized in response to the respective changing magnetic field to record the corresponding composite signal thereon.

BRIEF DESCRIPTION OF THE DRAWINGS

FIG. 3 shows the frequency spectrum envelope of the modulated composite signal recorded on or read from the magnetic tape; and FIG. 4 is a block diagram illustrating a read/write circuit for a two-track magnetic tape recorder and player according to the principles of this invention.

DETAILED DESCRIPTION OF THE INVENTION

Figure 1:
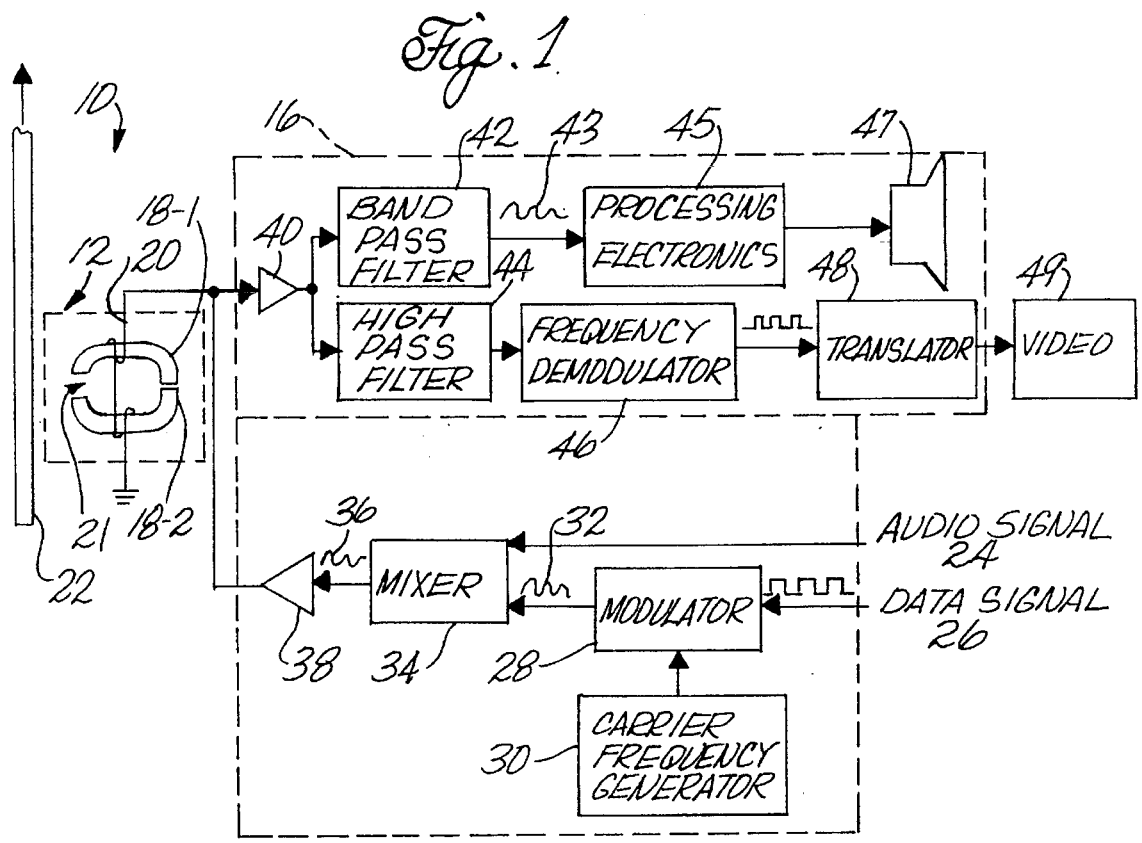
FIG. 1 is a block diagram for a read and write circuit for a single track magnetic tape recorder and player according to the principles of this invention.

FIG. 1 shows a read and write circuit for a single track magnetic tape recorder and player according to the principles of this invention. A magnetic tape player 10, preferably a cassette tape player, records and reads information from a magnetic tape 22. In alternate embodiments, the tape player 10 may either record or read but not both. The tape player 10 comprises a magnetic transducer 12, preferably a magnetic head, a write circuit 14, and a read circuit 16. The magnetic head 12 comprises a ferrite loop 18 having two C-shaped ferrite cores 18-1, 18-2 and a winding 20. The winding 20 is a thin elongated electrically-conductive wire surrounded by an electrical insulator and is wrapped around each of the ferrite cores 18-1, 18-2. One end of the winding 20 is grounded. The other end of the winding 20 is connected to both the output of the write circuit 14 and the input of the read circuit 16. A single winding is shown in FIG. 1 for clarity. In an actual implementation, the number of windings varies as a function of the size of the head, the type of ferrite material, and the type of magnetic tape 22 that is to be recorded. The magnetic head 12 shown in FIG. 1 is a typical embodiment. However, the invention is not limited to the magnetic head shown in FIG. 1. Other configurations of magnetic heads may be used. The magnetic head 12 reads and records data on the magnetic tape 22. In alternate embodiments, separate read heads and record heads are used.

The recording and reading of information from a magnetic tape is well known to those skilled in the art and will be discussed briefly here. The magnetic tape 22 comprises magnetic particles whose polarization is alterable by exposing them to a magnetic field. During recording, the orientation of the particles on the tape 22 is altered by applying a magnetic field to the particles and varying the polarity of the field in relation to the data that is being recorded. As the tape 22 moves across magnetic head 12, the write circuit 14 supplies a changing electrical current to the magnetic head to induce a change in the magnetic field applied by the head. Specifically, the current flows through the winding 20 that encircles the ferrite core 18-1, 18-2 to generate a varying magnetic field therein. This magnetic field produces a magnetic field across a gap 21 between the two ferrite cores 18-1, 18-2 that extends from the two cores to the magnetic tape 22. The varying magnetic field that is applied to a region on the tape 22 orients the particles in the region. As the tape 22 moves across the magnetic head 12, particles in successive regions on the tape become reoriented in response to the varying magnetic field.

Many recording systems modulate a high-frequency AC bias signal with the signal that is to be recorded. This modulated AC bias signal shifts the magnetization characteristics of the magnetic tape 22 into a more linear region. The linear region allows changes in the modulation of the AC bias frequency to cause linear changes in the magnetization of the tape and thereby reduce distortion in the recording. The use of AC biasing for recording is well known to those skilled in the art.

During reading, as the tape 22 moves across the magnetic head 12, the changing polarization of the particles on the tape 22 creates a changing magnetic field that is detected by the head. The changing field from the tape 22 changes the magnetic field in the ferrite cores 18 to thereby induce a varying electrical voltage in the winding 20. The varying voltage in the winding 20 produces a varying current in the winding that is read by the read circuit 16 as will be discussed below.

Returning to the record mode for the embodiment shown in FIG. 1, an audio signal 24 and a data signal 26 are inputted into the write circuit 14 to create a composite signal that is a carrier signal modulated by the data signal 26 and mixed with the audio signal 24. The data signal 26 contains information that relates to the information in the audio signal. The data signal contains preferably karaoke lyrics that relate to the music recorded in the audio signal 24. In an alternate embodiment, the audio signal 24 contains spoken words and the data signal 26 contains a transcript of the spoken words. In another alternate embodiment, the audio signal 24 contains spoken words in a first language, e.g., Chinese, and the data signal 26 contains a translation into a second language, e.g., English. As described in detail below, the information on the data signal is displayed during playback of the tape.

The data signal 26 is inputted into a modulator 28. A carrier frequency generator 30 generates a carrier signal of frequency $f_{CR}$ that is modulated by the data signal 26 in the modulator 28 to form a modulated signal 32. The modulator 28 preferably frequency modulates the carrier signal with the data signal 26. In alternate embodiments, the carrier may be modulated by the data using duty cycle modulation, amplitude modulation, phase modulation or other modulation techniques.

Figure 2:
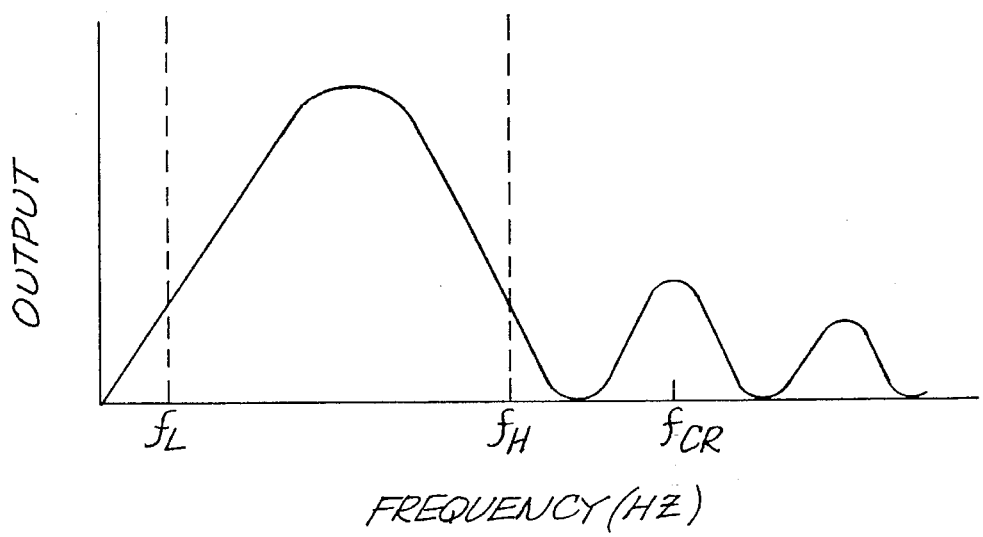
FIG. 2 shows the frequency response curve for the magnetic head shown in FIG. 1.

The carrier frequency $f_{CR}$ is preferably selected to optimize performance according to the frequency response characteristics of the magnetic head 12 as shown in FIG. 2. The frequency of the recorded signal is shown along the horizontal axis. The output of the magnetic head is shown along the vertical axis. The typical magnetic head has frequency response characteristics that increase to a maximum and then decrease down to a first null. As the frequency increases beyond the first null, the response curve has a group of sidelobes that have decreasing peak amplitudes for increasing frequency. The peak of the first sidelobe after the first null occurs typically at a frequency of approximately 33 KHz. The peak of the first sidelobe is typically 40 db below the maximum peak.

Human hearing is typically in the range of 20 Hz to 20 KHz. Most humans have a hearing range that is narrower than this range. However, consumer electronics are usually specified by their performance over the range of 20 Hz to 20 KHz. The frequency range of human hearing is shown in FIG. 2 bounded by the frequencies $f_L$ and $f_H$. Accordingly, $f_L$ is preferably 20 Hz; $f_H$ is preferably 20 KHz.

The carrier frequency of the carrier signal is selected to be approximately the frequency of the peak of the first sidelobe to maximize the frequency response of recording the modulated signal on the magnetic tape 22. Thus, the carrier frequency for the typical magnetic head is preferably 33 KHz. The data signal 26 is preferably frequency modulated onto the carrier frequency with a 3% modulation factor. Consequently, the modulated output of the modulator 28 is 32 KHz through 34 KHz. For a digital data signal 26, the modulated output of the modulator 28 is 32 KHz for a logic state 0 and 34 KHz for a logic state 1.

The modulated signal 32 from the modulator 28 is mixed with the audio signal 24 in a mixer 34. The mixed output 36 from the mixer 34 has a frequency spectrum envelope as shown in FIG. 3. More specifically, FIG. 3 shows the frequency spectrum envelope of the modulated composite signal recorded on or read from the magnetic tape as a function of frequency. The audio component of the composite signal 36 is shown as the rectangular region in the band between frequencies $f_L$ and $f_H$. As described above, $f_L$ and $f_H$ correspond to the low and high ends of the frequency range of human hearing, respectively. The modulated data signal is shown as three discrete frequencies at $f_{CR}$, $f_{CR+\Delta}$, and $f_{CR-\Delta}$, where $\Delta$ corresponds to the modulation factor. In the preferred embodiment as described above, $f_{CR}$ equals 33 KHz, $f_{CR+\Delta}$ equals 34 KHz, and $f_{CR-\Delta}$ equals 32 KHz.

Referring back to FIG. 1, the mixed signal 36 is amplified in an amplifier 38 to form a composite signal which is applied to the Winding 20. The recording of the composite signal on the tape is described above.

Turning now to the reproducing or reading of data from the magnetic tape 22, the magnetic head 12 detects the data on the magnetic tape 22 and converts the detected signals into a varying voltage that is amplified and filtered into audio and data components in the read circuit 16. As described above for the read mode, the magnetization on the magnetic tape generates a fluctuating magnetic field in the ferrite core 18 and thereby induces a varying electric voltage which generates a corresponding varying current in the winding 20. The varying current is amplified in an amplifier 40 and split into first and second divided signals. The first divided signal is inputted into a bandpass filter 42. The second divided signal is inputted into a high pass filter 44.

The bandpass filter 42 filters out frequency components outside the frequency range of human hearing to generate an audio signal 43. In the preferred embodiment, the bandpass filter 42 passes frequencies between 20 Hz and 20 Khz. The audio signal 43 is inputted into a processing electronics unit 45 whose output is applied to an output speaker 47 or headphones. The processing electronics unit, speaker, and headphones are similar to those used in a conventional magnetic tape player and which are well known to one skilled in the art.

The high pass filter 44 filters out frequencies below a predetermined cutoff frequency that is above the upper end of the frequency range of human hearing and below the lowest frequency component of the modulated data signal. The high pass cutoff frequency of the high pass filter 44 is selected to pass the 33 KHz carrier frequency and the modulated data frequencies of 32 KHz and 34 KHz corresponding to the logic 0 and logic 1 states of the data, respectively.

The filtered output of the high pass filter 44 is demodulated in a frequency demodulator 46 to generate a sequence of data bits corresponding to the prerecorded lyrics. The data bits are transformed in a translator 48 to a data format that is displayed on a display (not shown). The transformation of digital data into a display format is well known to one skilled in the art.

FIG. 4 shows a second embodiment according to the principles of this invention for a two-track magnetic tape recorder and player. The audio signals are recorded in both tracks, typically a left and right track, on the magnetic tape 22. Data that is related to the audio information in both tracks is recorded on one of the tracks. FIG. 4 shows the data being recorded on the right track. However, the data alternately may be recorded on the left track. Because of variations in the tape speed, the frequency of the read data shifts due to the change in speed of the magnetic particles moving across the magnetic head 12. This frequency shift may cause problems during the frequency demodulation of the frequency modulated data. More specifically, the shift may cause the frequency of the modulated data to move outside the detection range of the frequency demodulator 46 and thereby generate erroneous data. The two-track embodiment shown in FIG. 4 resolves this problem by recording the carrier frequency on one track and the modulated data signal on the other track. Because the frequency of both tracks is shifted substantially equally by the variations in the speed of the magnetic tape 22, the read signal of the two tracks can be subtracted to produce a sequence of data at the proper frequency.

The dual-track recorder operates in a manner similar to the single-track recorder described above in FIG. 1. The reference numbers Of circuits that are similar to those of the single-track recorder have been increased by 100. Reference numbers for circuits that are identical to the single track recorder are unchanged.

The writing of data will now be described. A write circuit 114 comprises a right track write circuit 114-R, a left track write circuit 114-L, and a carrier frequency generator 30. The right track write circuit 114-R operates in a manner similar to the write circuit 14 described above for FIG. 1. The carrier frequency generator 30 generates a carrier signal at frequency $f_{CR}$ which is then modulated by a data signal 126 in the modulator 28 to form a modulated signal 132. The data signal 126 contains information that is related to a portion of the audio information in a right track audio signal 124-R and a left track audio signal 124-L. The modulated signal 132 is mixed with the right track audio signal 124-R in the mixer 34. The output of the mixer 34 is amplified in an amplifier 38 and applied to the winding 20 of a right track magnetic head 112-R.

The left track write circuit 114-L is similar to the right track write circuit 114-R, but does not contain a modulated data signal 132. The left track audio signal 124-L is mixed with the unmodulated carrier signal, which is at frequency $f_{CR}$, from the carrier frequency generator 30 in a mixer 34. The output of the mixer 34 is amplified in an amplifier 38 and applied to the winding 20 of a left track magnetic head 112-L. Each magnetic head 112 generates a respective magnetic field to magnetize particles in a corresponding track on the magnetic tape 22. Writing to each of the tracks is done in a manner similar to the single-track tape recorder described above in FIG. 1.

Reading of data from each of the two tracks is done in a manner similar to the read circuit 16 described above in FIG. 1. Induced currents in each magnetic head 112 generate a respective detected signal that is inputted into the read circuit 116. Each detected signal is amplified and divided into two signals for bandpass and high pass filtering. The two bandpass-filtered signals become a right audio signal 143-R and a left audio signal 143-L. The two high pass-filtered signals are subtracted from each other, frequency demodulated, and translated into a display format.

In particular, voltage from the right track magnetic head 112-R generates a detected signal which is inputted into a right track filter circuit 116-R. The filter circuit 116-R filters the detected signal into a right audio signal 143-R and a high-frequency modulated signal internal to the filter circuit. More specifically, the output signal from the right track magnetic head 112-R is amplified by an amplifier 40 and divided into two divided signals. The first divided signal is inputted into a first bandpass filter 42 to pass the right audio signal 143-R in a manner similar to the bandpass filtering described above for FIG. 1. The second divided signal is inputted into a first high pass filter 44 to generate a high-frequency modulated signal component. The high-frequency modulated signal is shifted in frequency by the difference between the tape speed during read and the tape speed during record.

Separately and similarly, a detected signal from the left track magnetic head 112-L is inputted into the left track filter circuit 16-L. The detected signal is amplified by an amplifier 40 and similarly filtered as described above for the right track filter 116-R to generate a left audio signal 143-L in a second bandpass filter 42 and a filtered high-frequency unmodulated signal component in a second high pass filter 44. The high-frequency unmodulated signal component is a reconstruction of the unmodulated carrier frequency. The high-frequency unmodulated signal is shifted in frequency because of variations in the tape speed during read and the tape speed during record. The modulated signal component from the right track filter 116-R is subtracted from the unmodulated signal component from the left track filter circuit 116-L in a subtractor 50. The output of the subtractor 50 is a modulated signal corresponding to the data signal previously recorded on the magnetic tape 22.

The modulated signal is frequency demodulated in a frequency demodulator 46 to generate data signals in a manner similar to the single track recorder described above in FIG. 1. The data signal is translated in a translator 48 to generate a display format as described above for FIG. 1.

In an alternate embodiment, a two-track tape recorder and player plays and records a first and second data signal that contains data related to the audio information in a first and second audio signal in first and second tracks, respectively, and compensates for variations in the tape speed. The tape player operates in a manner similar to the embodiment described in FIG. 4. The first data signal is modulated onto a first ultrasonic carrier signal to form a modulated first carrier signal. The second data signal is modulated onto a second ultrasonic carrier signal to form a modulated second carrier signal. The first and second carrier signals have a frequency corresponding to the frequency of the peak of the first and second sidelobes of the frequency response curve for the magnetic head shown and described above for FIG. 2. The first audio signal, the first modulated carrier signal, and the unmodulated second carrier signal are mixed together and recorded on the first track of the magnetic tape. The second audio signal, the modulated second carrier signal and the unmodulated first carrier signal are mixed and recorded on the second track of the magnetic tape.

The read circuit for each track has first and second two bandpass filters. The first bandpass filter passes audio signals as described above for the bandpass filter 42 in FIG. 4. The second bandpass filter passes the frequencies in the range around the first carrier signal. More specifically, the second bandpass filter of the first track passes the modulated first carrier signal. The second bandpass filter for the second track passes the unmodulated first carrier signal. Similarly, the high pass filter passes the unmodulated second carrier signal in the first track and the modulated second carrier signal in the second track. The bandpass filter signal from the second bandpass filter of each track is subtracted, frequency demodulated, and translated into display data that is related to the first audio signal. Similarly, the high pass filter signals from the read circuit of the first and second tracks are subtracted, frequency demodulated, and translated into display data that is related to the second audio signal.

In another alternate embodiment, a two track tape recorder and player plays and records a first and second data signal that contains data related to the audio information in a first and second audio signal in first and second tracks, respectively, but unlike the previously described alternate embodiment, does not compensate for variations in the tape speed. The tape recorder and player operates in a manner similar to the previously described alternate embodiment but both the first and second data signals are modulated onto an ultrasonic carrier signal having the same frequency. Although the previously described alternate embodiment may be modified to eliminate the recording of the unmodulated first and second carrier signals as a frequency reference, this second alternate embodiment utilizes the increased tape response at the peak of the first sidelobe of the frequency response curve for the magnetic head as described above for FIG. 2.

Returning to the second alternate embodiment, a first and second audio signal containing a first and second audio information, respectively, are generated. First and second data that are related to the first and second audio signal, respectively, are also generated. A carrier frequency generator generates an ultrasonic carrier signal which is then modulated by the first and second data to form a first and second modulated ultrasonic carrier signal, respectively. The first modulated ultrasonic carrier signal is mixed with the first audio signal to form a first composite signal. The second modulated ultrasonic carrier signal is mixed with the second audio signal to form a second composite signal. The first and second composite signals are amplified and applied to a respective recording head positioned above the first and second tracks, respectively, on the magnetic tape to generate a respective varying magnetic field in response to the respective composite signal in a manner similar to that described above in FIG. 4. Each track magnetic tape is magnetized in response to the respective change in magnetic field to thereby record the corresponding composite signal thereon.

The recorder reads information from the magnetic tape in a manner similar to that described above. Changes in the magnetization of the first and second tracks on the magnetic tape are detected in a respective magnetic head. First and second composite signals from the detected changes are generated and inputted into a corresponding read circuit. Each composite signal corresponds to the information recorded in its associated track on the tape and has audio information and ultrasonic data information related to the audio information.

Each composite signal is power splitted into a first and second divided signal and inputted into a corresponding bandpass filter and a high pass filter. The first divided signal of the first and second composite signal are each bandpass filtered to eliminate ultrasonic frequencies and to reconstruct the first and second audio signals. The reconstructed audio signals are inputted into processing electronics whereby they are outputted on a speaker or headphones. The second divided signal of the first and second composite signal is high pass filtered to eliminate low frequencies and to generate a first and second high pass filtered signal, respectively. The first and second high pass filtered signals are demodulated in a frequency demodulator to generate a first and second modulated signal, respectively. The demodulated signals are inputted into a translator to generate first and second data information signals that contain the first and second data information, respectively, in a display format for a video display.

While the invention has been described and preferred embodiments disclosed, it is anticipated that other modifications and adaptations will occur to those skilled in the art. It is intended therefore that the invention be limited only by the claims appended hereto.

What is claimed is:

1. A method for recording audio information and data related to the audio information on the same track of a magnetic recording tape so that the magnetic recording tape may be interchangeably played in either a tape player that reads only audio information without interference from the data or a tape player that can read both the audio information and the data, the method comprising the steps of:

positioning a recording head near the track of the magnetic tape;

generating an unmodulated audio signal containing the audio information;

generating digital data that is related to the audio information;

generating a carrier signal at a frequency near the peak of a side lobe in the frequency response curve of the recording head and outside the frequency range of human hearing;

modulating the carrier signal with the data related to the information in the audio signal;

combining the audio signal and the modulated signal to form a composite signal;

applying the composite signal to the recording head to create a changing magnetic field in response to the composite signal; and magnetizing the track of the magnetic tape in response to the changing magnetic field to record the composite signal thereon.

2. The method of claim 1 wherein the carrier frequency is approximately 33 KHz.

3. The method of claim 1 wherein the step of modulating the ultrasonic carrier signal includes the step of frequency modulating the ultrasonic carrier signal.

4. The method of claim 1 wherein the audio information is music and the data related to the audio information is lyrics to the music.

5. A method for reading audio information and data related to the audio information from the same track of a magnetic tape comprising the steps of:

positioning a read head in close proximity to the track of the magnetic tape to detect changes in the magnetization of the track of the magnetic tape;

generating an electrical signal in response to the detected changes;

filtering the generated electrical signal to remove frequencies outside of the frequency range of human hearing to form an audio signal containing the audio information that is suitable for playing without having to be demodulated;

filtering the generated electrical signal to recover a carrier signal on which digital data is modulated, the carrier signal being at a frequency near the peak of a side lobe of the frequency response curve of the read head and outside the frequency range of human hearing; and demodulating the carrier signal to form a data signal containing the information related to the audio signal.

6. The method of claim 5 wherein the audio information is music and the data related to the audio information is lyrics to the music.

7. The method of claim 6 further comprising the steps of playing the music and displaying the lyrics to the music in synchronization with the music being played.

8. The method of claim 5 wherein the carrier frequency is approximately 33 KHz.

9. The method of claim 8 wherein the modulated data is digital data frequency modulated onto the carrier signal so that a first logic state is at 32 KHz and a second logic state is at 34 KHz.

10. A method for recording audio information and data related to the audio information on the same track of a magnetic recording tape so that the magnetic recording tape may be interchangeably played in either a tape player that reads only audio information without interference from the data or a tape player that can read both the audio information and the data, the method comprising the steps of:

generating a signal containing the audio information;

generating data that is related to the audio information;

generating an ultrasonic carrier signal having a frequency near the peak of a sidelobe in the frequency response curve of the recording head and outside the frequency range of human hearing;

modulating the ultrasonic carrier signal with the data related to the information in the audio signal;

combining the audio signal and the modulated ultrasonic signal to form a composite signal;

applying the composite signal to a recording head positioned above the track of the magnetic tape to create a changing magnetic field in response to the composite signal; and magnetizing the track of the magnetic tape in response to the changing magnetic field to record the composite signal thereon.

11. The method of claim 10 wherein the carrier frequency is approximately 33 Khz.

12. A method for reading audio information and modulated data related to the audio information from the same track of a magnetic tape comprising the steps of:

detecting changes in the magnetization of the track of the magnetic tape by the use of a read head;

generating an electrical signal in response to the detected changes;

dividing the generated electrical signal into first and second divided signals;

filtering the first divided signal to remove frequencies outside of the frequency range of human hearing to form an audio signal containing the audio information;

filtering the second divided signal to remove frequency components below a predetermined frequency to form a high pass filtered signal; and frequency demodulating the high pass filtered signal from an ultrasonic carrier signal having a frequency near the peak of a sidelobe of the frequency response curve of the read head and outside the frequency range of human hearing in order to form a data signal containing the information related to the audio signal.

13. The method of claim 12 wherein the carrier frequency is approximately 33 KHz.

14. The method of claim 13 wherein the modulated data is digital data frequency modulated onto the carrier signal so that a first logic state is at 32 KHz and a second logic state is at 34 KHZ.

\* \* \* \* \*